US011587590B2

(12) United States Patent
Karri et al.

(10) Patent No.: US 11,587,590 B2
(45) Date of Patent: Feb. 21, 2023

(54) PROGRAMMATICALLY CONTROLLING MEDIA CONTENT NAVIGATION BASED ON CORRESPONDING TEXTUAL CONTENT

(71) Applicant: INTERNATIONAL BUSINESS MACHINES CORPORATION, Armonk, NY (US)

(72) Inventors: Venkata Vara Prasad Karri, Visakhapatnam (IN); Abhishek Jain, Baraut (IN); Sarbajit K. Rakshit, Kolkata (IN)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 17/302,196

(22) Filed: Apr. 27, 2021

(65) Prior Publication Data

US 2022/0343950 A1 Oct. 27, 2022

(51) Int. Cl.
*G06F 3/0484* (2022.01)
*G06F 3/0482* (2013.01)
*G11B 27/00* (2006.01)

(52) U.S. Cl.
CPC .......... *G11B 27/005* (2013.01); *G06F 3/0482* (2013.01); *G06F 3/0484* (2013.01)

(58) Field of Classification Search
CPC .... G11B 27/005; G06F 3/0482; G06F 3/0484
See application file for complete search history.

(56) References Cited

U.S. PATENT DOCUMENTS

| 9,870,796 | B2 | 1/2018 | Goldberg | |
|---|---|---|---|---|
| 10,372,754 | B2 | 8/2019 | Chakra | |
| 10,678,427 | B2 | 6/2020 | Xu | |
| 2014/0218343 | A1* | 8/2014 | Hicks | G06F 3/04883 345/179 |
| 2015/0116282 | A1* | 4/2015 | Black | G06F 40/171 345/179 |
| 2015/0134742 | A1* | 5/2015 | Ikeda | H04L 65/403 709/204 |
| 2018/0095555 | A1* | 4/2018 | Gemerman | G06F 3/0383 |
| 2018/0302453 | A1 | 10/2018 | Gurtowski | |
| 2018/0349692 | A1* | 12/2018 | Dixon | G06F 3/03545 |
| 2019/0102139 | A1* | 4/2019 | Liusaari | G06F 3/165 |

(Continued)

OTHER PUBLICATIONS

Karam, "Tere Hamsafar Geet Hai Tere Lyrics," LyricsBogie.com, [accessed on Feb. 24, 2021], 9 pages, Retrieved from the Internet: <URL: https://www.lyricsbogie.com/tere-hamsafar-geet-hai-tere/>.

(Continued)

*Primary Examiner* — Thai Q Tran
*Assistant Examiner* — Jose M Mesa
(74) *Attorney, Agent, or Firm* — Alexis N. Hatzis (57) ABSTRACT

A method, computer system, and a computer program product for content navigation within a media player is provided. The present invention may include displaying, by a computing device, a media content and a corresponding textual content. The present invention may include receiving, from a user, input regarding the textual content. The present invention may include modifying a playback of the media content based upon the input regarding the textual content to generate a modified media content. The present invention may include playing the modified media content.

20 Claims, 6 Drawing Sheets

(56) References Cited

U.S. PATENT DOCUMENTS

2019/0172166 A1    6/2019  Evans
2021/0248136 A1*   8/2021  Panuganty ............ G06F 16/243

OTHER PUBLICATIONS

Mell, et al., "The NIST Definition of Cloud Computing", National Institute of Standards and Technology, Special Publication 800-145, Sep. 2011, 7 pages.

Screen captures from YouTube video clip entitled "Tere Humsafar Geet Hain Tere—Raj Kapoor—Randhir Kapoor—Dharam Karam—Bollywood Songs," 4 pages, uploaded on Jul. 16, 2010 by user "Shemaroo Filmi Gaane," Retrieved from the Internet: <URL: https://www.youtube.com/watch?v=K_GW_hjY2RI&list=RDMMK_GW_hjY2RI&start_radio=1>.

Siddiqua, et al., "Application for Selective Streaming of Video Components," ResearchGate, 2015, pp. 220-228, Springer International Publishing, CH, DOI: 10.1007/978-3-319-23126-6 20.

* cited by examiner

PROGRAMMATICALLY CONTROLLING MEDIA CONTENT NAVIGATION BASED ON CORRESPONDING TEXTUAL CONTENT

BACKGROUND

The present invention relates generally to the field of computing, and more particularly to media playback systems.

A method of enhancing user experience while watching and/or listening to video and/or audio content on a media playback system may include reading corresponding textual content (e.g., lyrics, a transcript, and/or any textual document related to an audio and/or a video file) and issuing commands to control the media playback system based on upon this textual content. A user may read the textual content while simultaneously listening to the video and/or audio content and may control the media playback system by providing annotation on the corresponding textual content.

SUMMARY

Embodiments of the present invention disclose a method, computer system, and a computer program product for content navigation within a media player. The present invention may include displaying, by a computing device, a media content and a corresponding textual content. The present invention may include receiving, from a user, input regarding the textual content. The present invention may include modifying a playback of the media content based upon the input regarding the textual content to generate a modified media content. The present invention may include playing the modified media content.

The present invention may further include controlling the playback of the media content (e.g., by pausing, replaying, and/or skipping a section of the media content) by utilizing an overlaid pointer which may have the advantage of enabling the user to select and/or modify a user's selection based on a visual meter.

The present invention may further include performing a contextual interaction on the textual content using an electronic pen and/or stylus which may have the advantage of linking sections of one or more audio and/or visual content(s) using ordinary written symbols and/or text.

BRIEF DESCRIPTION OF THE SEVERAL VIEWS OF THE DRAWINGS

These and other objects, features and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. In the drawings.

DETAILED DESCRIPTION

Detailed embodiments of the claimed structures and methods are disclosed herein; however, it can be understood that the disclosed embodiments are merely illustrative of the claimed structures and methods that may be embodied in various forms. This invention may, however, be embodied in many different forms and should not be construed as limited to the exemplary embodiments set forth herein. Rather, these exemplary embodiments are provided so that this disclosure will be thorough and complete and will fully convey the scope of this invention to those skilled in the art. In the description, details of well-known features and techniques may be omitted to avoid unnecessarily obscuring the presented embodiments.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a standalone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The following described exemplary embodiments provide a system, method and program product for content navigation. As such, the present embodiment has the capacity to improve the technical field of media playback systems by controlling media content navigation based on related (e.g., correlated) textual content. More specifically, the present invention may include displaying, by a computing device, a media content and a corresponding textual content (e.g., lyrics, a transcript, and/or any textual document related to an audio and/or a video file). The present invention may include receiving, from a user, input regarding the textual content. The present invention may include modifying a playback of the media content based upon the input regarding the textual content to generate a modified media content. The present invention may include playing the modified media content.

As described previously, a method of enhancing user experience while watching and/or listening to video and/or audio content on a media playback system may include reading corresponding textual content (e.g., lyrics, a transcript, and/or any textual document related to an audio and/or a video file) and issuing commands to control the media playback system based on upon this textual content. A user may read the textual content while simultaneously listening to the video and/or audio content and may control the media playback system by providing annotation on the corresponding textual content. However, existing methods of textual and video and/or audio correlation may not enable the user to dynamically adjust a playback of an audio and/or video file based upon user input.

Therefore, it may be advantageous to, among other things, embed a feature and/or plugin on an Internet browser which may enable a user to control a running video and/or audio (i.e., media content) played in an application and/or Internet browser based on related textual content available in a separate window (e.g., another Internet browser, etc., by drawing rules (e.g., conditions, preferences) on the textual content which define a playback of the media content (e.g., the video and/or audio content).

According to at least one embodiment, the present invention may enable a user to control a navigation of media content with related textual content. For example, the user may be reading the related textual content while the media content is being played. A pointer may be overlaid over the textual content in a synchronized manner (e.g., corresponding to the media content being played) and the user may utilize the pointer to control the navigation of the media content (e.g., by pausing, replaying a section, and/or skipping a section, among other things), and, correspondingly, the media content is paused, replayed, skipped, etc.

According to at least one embodiment, the present invention may enable a user to navigate media content (e.g., video and/or audio content) by performing multifarious actions including, but not limited to, the user humming a portion of the media content, a home automation system acting as input based on a spoken command, and/or pressing a play button on a media control menu. Each action performed by the user and/or an agent of the user's (e.g., the home automation system) may result in synchronization of the pointer between the media content and the textual content.

According to at least one embodiment, the present invention may enable a user to perform a contextual interaction on the textual content using an electronic pen and/or stylus. The contextual interaction with the electronic pen and/or stylus may include defining a boundary around the textual content, linking multiple sections of textual content, and/or writing an action to be performed by the content navigation program (e.g., play, skip, repeat a number of cycle(s)).

Alternatively, and/or additionally, an embedded paint application and/or paint module may be invoked to enable a user to perform the contextual interaction with the textual content (e.g., by drawing a known symbol on the user's display device using the electronic pen and/or stylus, including, but not limited to, the shape of a stop button, a pause button, and/or a resume button which signals to the content navigation program to perform a corresponding action). The content navigation program may identify a corresponding action based on a historical action of the user and/or a user's voice command, among other things.

According to at least one embodiment, the present invention may display a media content navigation menu overlaid over the textual content (i.e., the related textual content) which may depict a progress of the media content playback and which may further enable the user to control the media content from the textual content based on, for example, a user's configured frequency of times to repeat a portion of the media content (e.g., based on the user's preference for that portion) and/or based on the content navigation program's configured frequency to repeat a portion of the media content based on the user's contextual performance metrics for that portion of the media content. For example, the user may specify a number of times that the user wishes to listen to a selected portion of a media content (e.g., to play the first stanza two times then the last stanza three times). Alternatively, and/or additionally, the content navigation program may identify a familiarity of the user with those stanzas (e.g., the first and the last stanza) and may configure the repetition of the stanzas accordingly. The content navigation program may identify a familiarity based on historical preferences of the user (e.g., what types of content the user has played and how many times).

Figure 1:
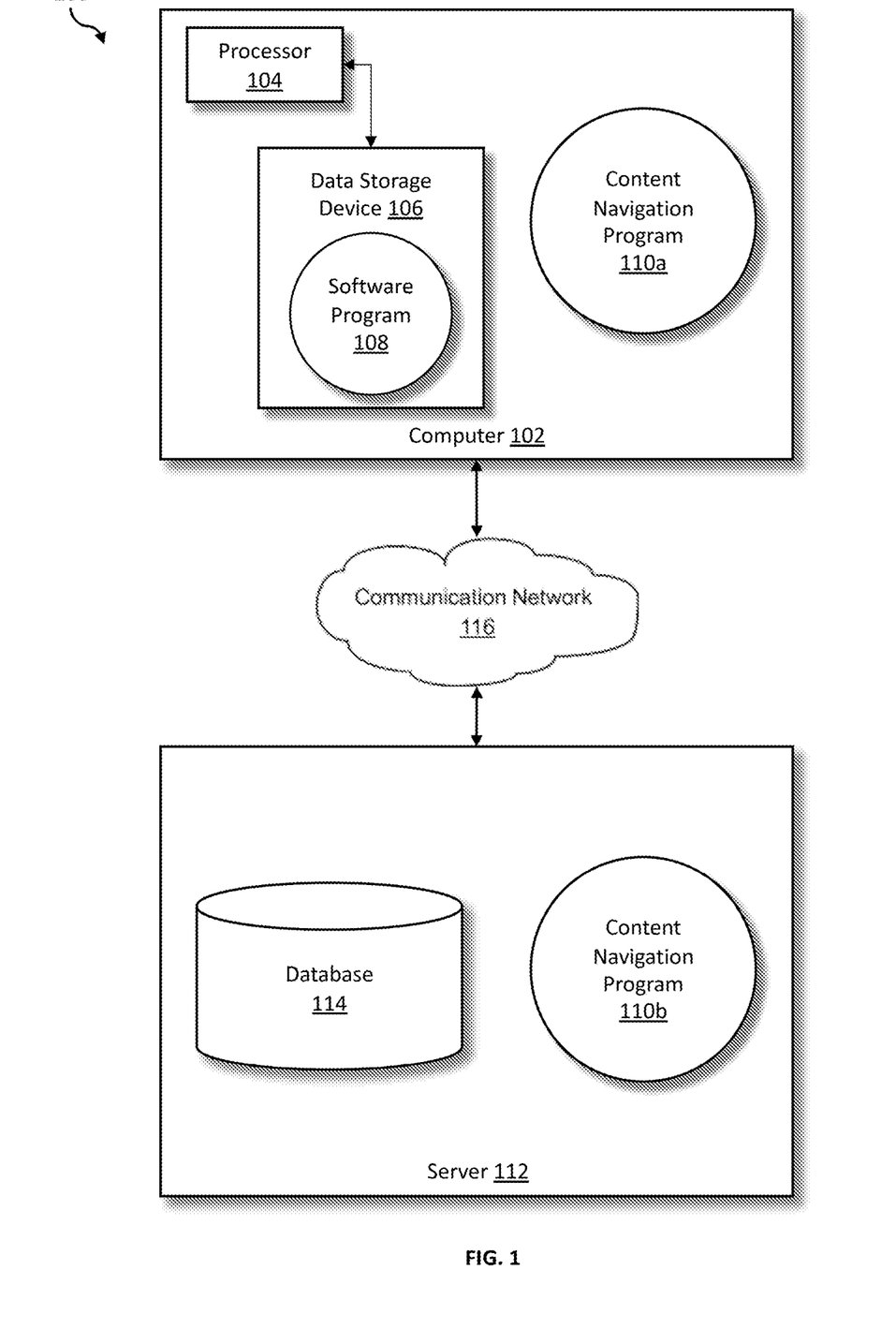
FIG. 1 illustrates a networked computer environment according to at least one embodiment.

Referring to FIG. 1, an exemplary networked computer environment 100 in accordance with one embodiment is depicted. The networked computer environment 100 may include a computer 102 with a processor 104 and a data storage device 106 that is enabled to run a software program 108 and a content navigation program 110a. The networked computer environment 100 may also include a server 112 that is enabled to run a content navigation program 110b that may interact with a database 114 and a communication network 116. The networked computer environment 100 may include a plurality of computers 102 and servers 112, only one of which is shown. The communication network 116 may include various types of communication networks, such as a wide area network (WAN), local area network (LAN), a telecommunication network, a wireless network, a public switched network and/or a satellite network. It should be appreciated that FIG. 1 provides only an illustration of one implementation and does not imply any limitations with regard to the environments in which different embodiments may be implemented. Many modifications to the depicted environments may be made based on design and implementation requirements.

The client computer 102 may communicate with the server computer 112 via the communications network 116. The communications network 116 may include connections, such as wire, wireless communication links, or fiber optic cables. As will be discussed with reference to FIG. 4, server computer 112 may include internal components 902a and external components 904a, respectively, and client computer 102 may include internal components 902b and external components 904b, respectively. Server computer 112 may also operate in a cloud computing service model, such as Software as a Service (SaaS), Platform as a Service (PaaS), or Infrastructure as a Service (IaaS). Server 112 may also be located in a cloud computing deployment model, such as a private cloud, community cloud, public cloud, or hybrid cloud. Client computer 102 may be, for example, a mobile device, a telephone, a personal digital assistant, a netbook, a laptop computer, a tablet computer, a desktop computer, or any type of computing devices capable of running a program, accessing a network, and accessing a database 114. According to various implementations of the present embodiment, the content navigation program 110a, 110b may interact with a database 114 that may be embedded in various storage devices, such as, but not limited to a computer/mobile device 102, a networked server 112, or a cloud storage service.

According to the present embodiment, a user using a client computer 102 or a server computer 112 may use the content navigation program 110a, 110b (respectively) to control media content navigation using correlated textual content. The content navigation method is explained in more detail below with respect to FIGS. 2 and 3.

Figure 2:
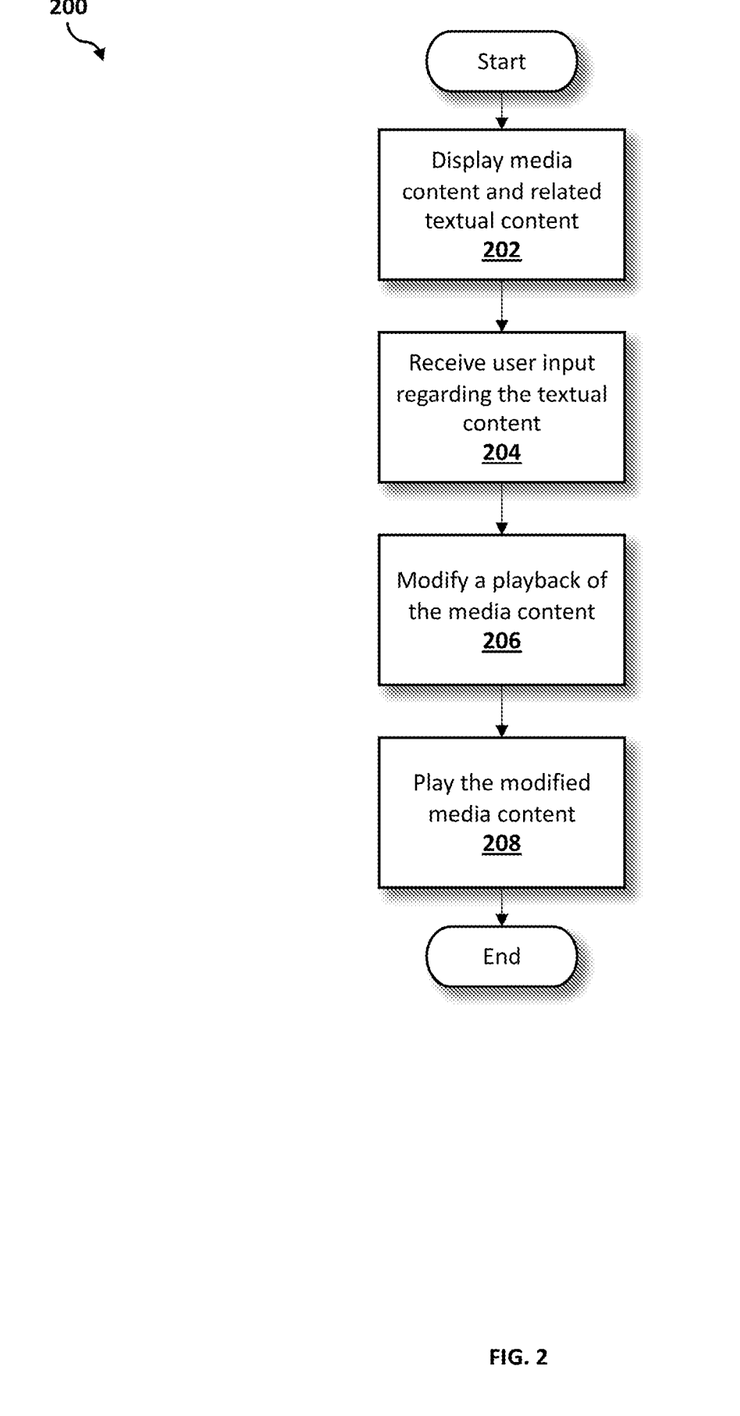
FIG. 2 is an operational flowchart illustrating a process for content navigation according to at least one embodiment.

Referring now to FIG. 2, an operational flowchart illustrating the exemplary content navigation process 200 used by the content navigation program 110a and 110b according to at least one embodiment is depicted.

At 202, media content and related textual content is displayed. Media content (e.g., video and/or audio content) may be played using an Internet browser on a user's computer. The content navigation program 110a, 110b may be installed on the user's browser as, for example, a plugin. The plugin of the content navigation program 110a, 110b may include a video and/or audio analysis engine (i.e., the analysis engine) which may first convert the media content into a textual equivalent (i.e., textual content) to be presented to the user. The user may thereafter annotate the textual content to modify the playing sequence of the video and/or audio content. A modification of the textual content may be described in more detail with respect to step 204 below.

The content navigation program 110a, 110b may also be installed as a cloud-based service and/or a mobile application (e.g., for use on a tablet), among other installation options.

When media content is played, the video and/or audio analysis engine (i.e., the analysis engine) may identify textual information about the media content from a public domain (e.g., from a video sharing service that allows users to watch videos posted by other users and/or to upload videos of their own, and/or from a search engine, among other things). The video and/or audio analysis engine (i.e., the analysis engine) may include video analysis software which may analyze a video image, an audio component of a video and/or a caption of a media content. Textual information about the media content may be identified using natural language processing (NLP) and semantic understanding techniques (e.g., by using a speech to text converter integrated in the analysis engine to convert the analyzed sounds to text using algorithms which find the most probable word fit given an identified content).

For any media content (e.g., video and/or audio content) identified, the analysis engine may derive textual content (e.g., a video and/or audio transcript) using voice to text technology.

If, alternatively and/or additionally, the media content is observed on a television, then the analysis engine may translate the media content into a textual equivalent (i.e., the textual content) and may send the textual content to a connected computer and/or mobile device (e.g., the computer and/or mobile device may have been configured by a user of the program at an initiation and/or installation phase of the content navigation program 110a, 110b).

A user may also define the textual content which may be related to the video and/or audio content (e.g., the media content) by manually annotating (e.g., writing, circling, crossing out, underlining) the textual content and/or by selecting a portion and/or portions of the textual content.

Textual content may be viewed using the Internet browser on the user's computer and/or on another application on the user's mobile and/or other device which supports the format of the identified textual content. An audio playback device and a display device (e.g., for textual content) may be paired by establishing a wireless and/or Bluetooth® (Bluetooth and all Bluetooth-based trademarks and logos are trademarks or registered trademarks of Bluetooth SIG, Inc. and/or its affiliates) connection so that the two may be enabled to communicate even in the event the devices are separated. The pairing of devices may be relevant when the media content is viewed on a television, where the textual content may not be annotated directly on the viewing device and thus a pairing may be required (e.g., between the television as a viewing device and a second device used to view the textual content) to ensure that the annotation is carried out as an amended viewing sequence, as intended.

At 204, user input regarding the media content is received. As described previously with respect to step 202 above, a user may define (e.g., as user input) which portions of the media content the user wishes to synchronize with the related textual content. The user may also define which portions of the textual content should be synchronized with the media content.

As described previously with respect to step 202 above, a device used to view the media content and/or the textual content may be a mobile device using an Internet browser or a standalone application. The media content may also be played on the user's computer and/or television, and two devices may be used (e.g., one device to view the media content and one device to view the textual content) and may be paired using a wireless and/or Bluetooth® (Bluetooth and all Bluetooth-based trademarks and logos are trademarks or registered trademarks of Bluetooth SIG, Inc. and/or its affiliates) connection.

Based on the defined portions of the media content and/or the textual content, the media content playing on the user's device may be validated (e.g., prior to the media content playing on the user's device, the content navigation program 110a, 110b may confirm that the user's annotations may be carried out and the video and/or audio content may be played in accordance with the user's direction) to determine that the media content and the textual content are synchronized. A validation of the media content and/or the textual content may be performed by comparing and/or searching the media content and the textual content using a machine learning transcription algorithm (e.g., a content validation algorithm) to determine whether the media content playing on the user's device is the same as the related textual content defined by the user. This may be referred to as a validation process which may include content comparison of the media content and the textual content by first converting the media content to text using speech recognition technology (as described previously with respect to step 202 above) to listen to the media content and to interpret anything which may be said. Once a video and/or audio file (i.e., a media content) has been converted to text, the validation process of the content navigation program 110a, 110b may validate the media content with the textual content.

If the content is not validated, the content navigation program 110a, 110b may notify the user that the textual content and the media content (e.g., the video) are not the same (e.g., the text is not from the video being played) and/or that a scenario the user is asking for (e.g., a modification of the playing sequence of the media content) is not possible.

Otherwise, if the media content is validated (e.g., the media content playing on the user's device is the same as the related textual content and/or that a modification of the playing sequence requested by the user is possible), then the media content playing on the user's device may be deemed to be synchronized with the related textual content and a pointer (i.e., a media content navigation pointer, a cursor) depicting a location of the current playback may appear on the user's screen. The pointer may be a movable indicator on a computer screen, such as a cursor, which may identify the location of the current playback of the media content on the related textual content (e.g., enabling the user to follow along with the media content by reading a corresponding portion of the related textual content).

In order for the pointer to accurately depict the location of the current playback, the media playing device (i.e., the user's device) may perform real time searching of the textual content. This may be done using a textual content comparison tool (e.g., using artificial intelligence and machine learning, in real time, to identify similarities between a playback of the media content and a pointer depicted on the textual content).

The content navigation program 110a, 110b may additionally or alternatively overlay a media control menu (e.g., a scroll bar) of the user's device around the pointer displayed on the mapped textual content. Progress of the media content may be depicted by moving the pointer in a synchronized fashion (e.g., in accordance with a playback of the media content).

The user may select the pointer overlaid on the textual content in order to signal to the media playing device that a new portion of the media content should be played. An electronic pen may alternatively or additionally be used to effectuate such a selection on the textual content. The electronic pen may also be used to write text and/or draw symbols on the textual content, among other things.

At 206, a playback of the media content is modified based on the user input. As described previously with respect to step 204 above, the user may write text and/or draw symbols, among other things, on the textual content using an electronic pen-based interaction. This may include circling a portion of the text and including a note which states "play twice." These instructions may be considered programmatic control of the user and may be sent to a display module which may facilitate the modification of the media content accordingly.

The user may select multiple portions of the related textual content, at the user's own discretion, using a closed loop contour (e.g., to select a textual content boundary, with text inside the boundary being considered for validation with the media content) and may create a relationship and/or playing sequence (e.g., repeat action play of section 1 after section 4) on the textual content. The display module (e.g., component of the media playing device and/or display device where the related textual content is displayed) may identify the contextual meaning of the drawing and/or handwriting in order to determine the user's requested action and to play the media content in accordance with the user's requested action (e.g., imposed rule).

Identifying the contextual meaning of the drawing and/or handwriting may be based on historical learning by the content navigation program 110a, 110b. The content navigation program 110a, 110b may utilize past interactions with the user in order to identify the meaning of a user's electronic pen-based interaction (e.g., the meaning of a rule imposed by the user on the textual content). The content navigation program 110a, 110b may, for example, learn which portion of the media content is played multiple times, which playing sequence has been defined on the textual content, and/or any other details about the order in which the media content is desired to be played.

At 208, a modified media content is played. Based on the user's electronic pen-based interactions, among other interactions with the content navigation program 110a, 110b, the media content may be played based on a modified playing sequence (i.e., a modified media content).

The content navigation program 110a, 110b may also enable the combination of two or more media contents utilizing two or more corresponding textual contents. A user may watch and/or listen to audio and/or video data from an online (e.g., an Internet connected) database and/or an offline (e.g., a non-Internet connected) database at the same time and may move between the audio and/or video data. The corresponding textual contents may include metadata from which a flow diagram may be created (e.g., based on annotations on the text). A playing engine of the content navigation program 110a, 110b may accordingly go between videos based on a user's annotation (e.g., by identifying, based on metadata, which data is being selected, and by playing the selected portion(s) of each audio and/or video file).

The user may save the modified media content and may access and replay the modified media content at a later time.

Additional programmatic control(s) may be imposed on either the media content and/or the modified media content so that the user may generate additional modified media content(s).

Figure 3:
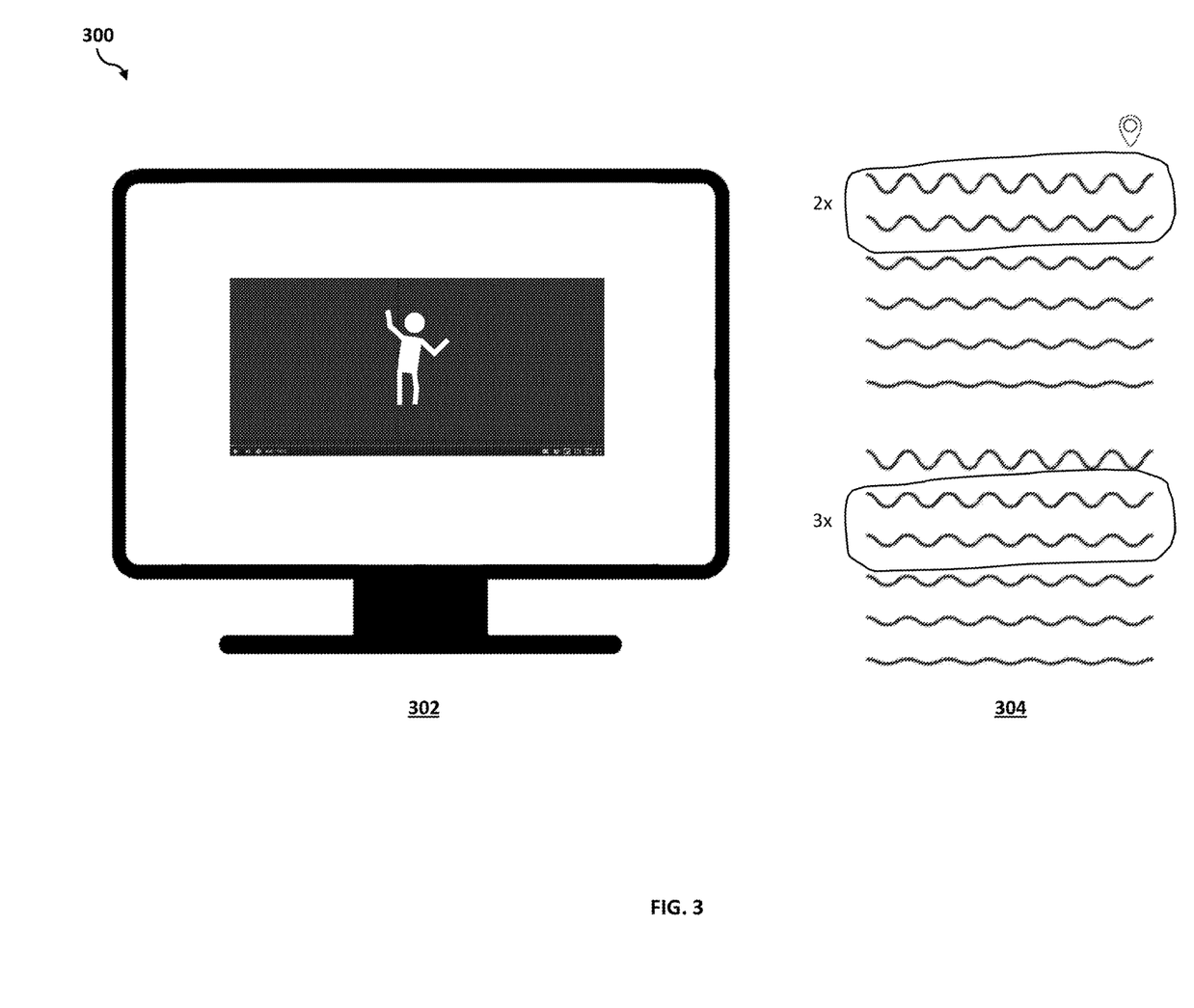
FIG. 3 is a block diagram of the content navigation program according to at least one embodiment.

Referring now to FIG. 3, an exemplary illustration of a block diagram 300 of the content navigation program 110a, 110b according to at least one embodiment is depicted. At 302, a video is playing on a user's computer. At 304, corresponding lyrics populate for the video playing on the user's computer. The corresponding lyrics may populate on the screen of the user's computer and/or on another device which may be registered with the content navigation program 110a, 110b. Using an electronic pen, the user has selected a portion of the text and has indicated how many times the media player should play the selected portion of text. A cursor depicts the current playback location of the video on the user's computer.

In this example, the user has specified the number of times each selection of the media text should be played (e.g., by performing programmatic control). The user has performed programmatic control of the video by performing a textual markup while actively viewing the video. The user may save the programmatic view for later reference and review.

If the user had not specified a number of times each selection of the media text should be played (e.g., by performing programmatic control), then the content navigation program 110a, 110b may have alternatively automatically identified the user's familiarity with the video performance (e.g., based on machine learning algorithms which review past actions of the user including a user's viewing history and viewing tendencies such as repetition schedule of a given type of video, among other things). Once a user's familiarity with the video performance (i.e., a user's contextual metrics) is automatically identified, the content navigation program 110a, 110b may set the number of repetition times as may be appropriate for the user.

The content navigation program 110a, 110b may also dynamically suggest a sequence of playing, further based on the user's viewing tendencies. This may include filtering out undesirable portions of the video based on the user's needs, likes and dislikes (e.g., the content navigation program 110a, 110b may filter cooking recipes which include meat based on a vegetarian viewer's past video content including only vegetarian dishes).

It may be appreciated that FIGS. 2 and 3 provide only an illustration of one embodiment and do not imply any limitations with regard to how different embodiments may be implemented. Many modifications to the depicted embodiment(s) may be made based on design and implementation requirements.

Figure 4:
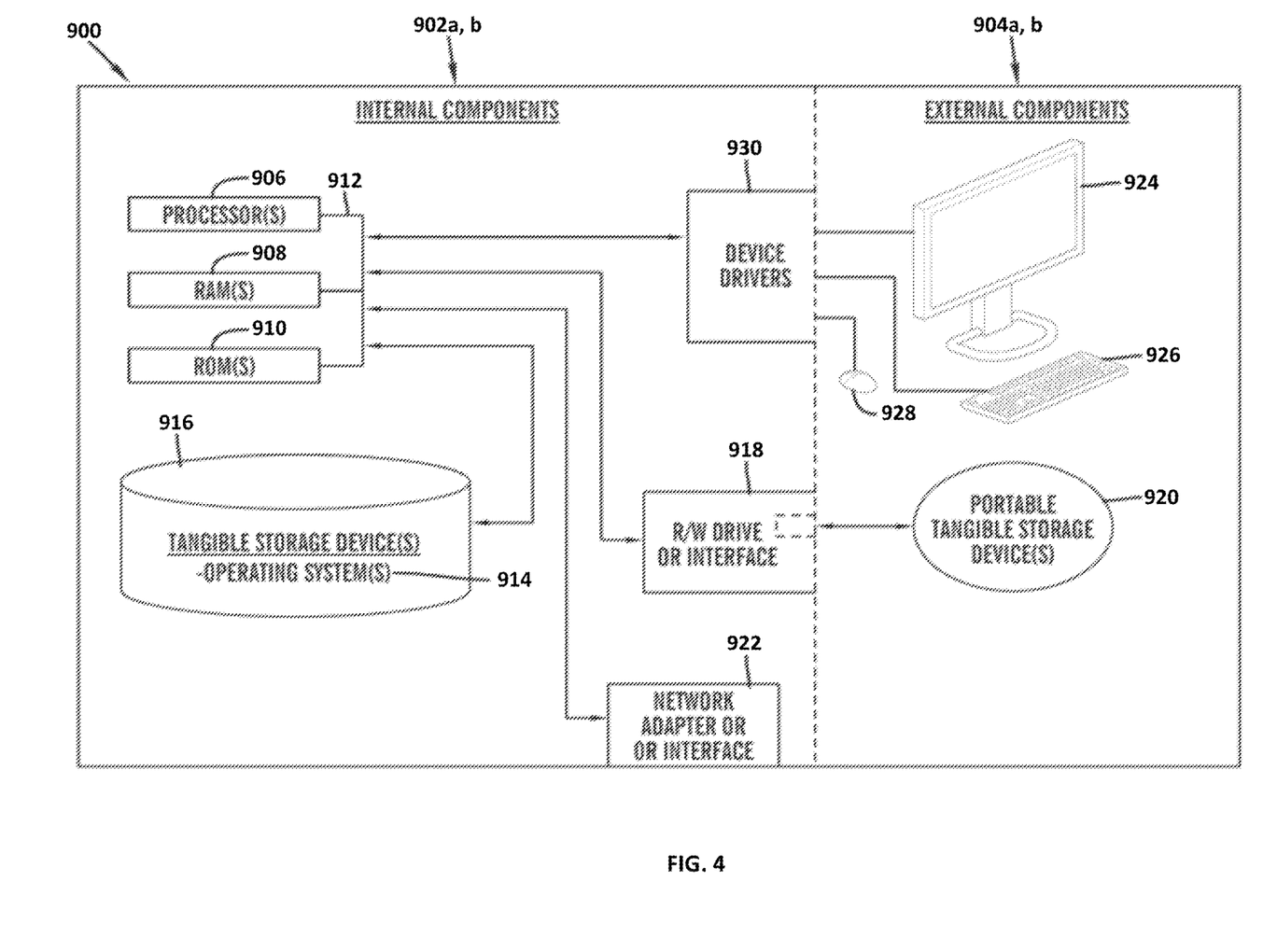
FIG. 4 is a block diagram of internal and external components of computers and servers depicted in FIG. 1 according to at least one embodiment.

FIG. 4 is a block diagram 900 of internal and external components of computers depicted in FIG. 1 in accordance with an illustrative embodiment of the present invention. It should be appreciated that FIG. 4 provides only an illustration of one implementation and does not imply any limitations with regard to the environments in which different embodiments may be implemented. Many modifications to the depicted environments may be made based on design and implementation requirements.

Data processing system 902, 904 is representative of any electronic device capable of executing machine-readable program instructions. Data processing system 902, 904 may be representative of a smart phone, a computer system, PDA, or other electronic devices. Examples of computing systems, environments, and/or configurations that may represented by data processing system 902, 904 include, but are not limited to, personal computer systems, server computer systems, thin clients, thick clients, hand-held or laptop devices, multiprocessor systems, microprocessor-based systems, network PCs, minicomputer systems, and distributed cloud computing environments that include any of the above systems or devices.

User client computer 102 and network server 112 may include respective sets of internal components 902 a, b and external components 904 a, b illustrated in FIG. 4. Each of the sets of internal components 902 a, b includes one or more processors 906, one or more computer-readable RAMs 908 and one or more computer-readable ROMs 910 on one or more buses 912, and one or more operating systems 914 and one or more computer-readable tangible storage devices 916. The one or more operating systems 914, the software program 108, and the content navigation program 110a in client computer 102, and the content navigation program 110b in network server 112, may be stored on one or more computer-readable tangible storage devices 916 for execution by one or more processors 906 via one or more RAMs 908 (which typically include cache memory). In the embodiment illustrated in FIG. 4, each of the computer-readable tangible storage devices 916 is a magnetic disk storage device of an internal hard drive. Alternatively, each of the computer-readable tangible storage devices 916 is a semiconductor storage device such as ROM 910, EPROM, flash memory or any other computer-readable tangible storage device that can store a computer program and digital information.

Each set of internal components 902 a, b also includes a R/W drive or interface 918 to read from and write to one or more portable computer-readable tangible storage devices 920 such as a CD-ROM, DVD, memory stick, magnetic tape, magnetic disk, optical disk or semiconductor storage device. A software program, such as the software program 108 and the content navigation program 110a and 110b can be stored on one or more of the respective portable computer-readable tangible storage devices 920, read via the respective R/W drive or interface 918 and loaded into the respective hard drive 916.

Each set of internal components 902 a, b may also include network adapters (or switch port cards) or interfaces 922 such as a TCP/IP adapter cards, wireless wi-fi interface cards, or 3G or 4G wireless interface cards or other wired or wireless communication links. The software program 108 and the content navigation program 110a in client computer 102 and the content navigation program 110b in network server computer 112 can be downloaded from an external computer (e.g., server) via a network (for example, the Internet, a local area network or other, wide area network) and respective network adapters or interfaces 922. From the network adapters (or switch port adaptors) or interfaces 922, the software program 108 and the content navigation program 110a in client computer 102 and the content navigation program 110b in network server computer 112 are loaded into the respective hard drive 916. The network may comprise copper wires, optical fibers, wireless transmission, routers, firewalls, switches, gateway computers and/or edge servers.

Each of the sets of external components 904 a, b can include a computer display monitor 924, a keyboard 926, and a computer mouse 928. External components 904 a, b can also include touch screens, virtual keyboards, touch pads, pointing devices, and other human interface devices. Each of the sets of internal components 902 a, b also includes device drivers 930 to interface to computer display monitor 924, keyboard 926 and computer mouse 928. The device drivers 930, R/W drive or interface 918 and network adapter or interface 922 comprise hardware and software (stored in storage device 916 and/or ROM 910).

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 5:
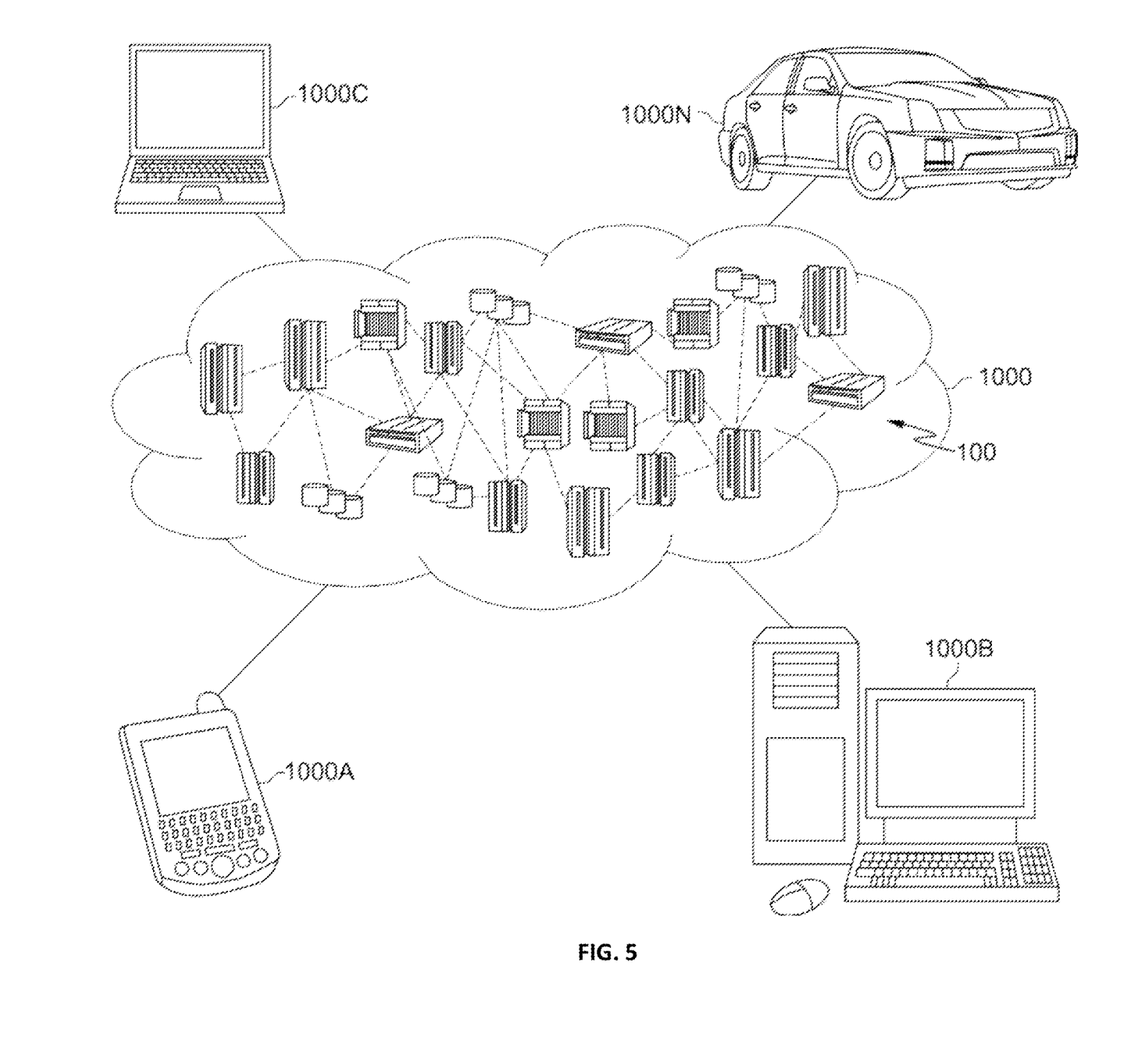
FIG. 5 is a block diagram of an illustrative cloud computing environment including the computer system depicted in FIG. 1, in accordance with an embodiment of the present disclosure.

Referring now to FIG. 5, illustrative cloud computing environment 1000 is depicted. As shown, cloud computing environment 1000 comprises one or more cloud computing nodes 100 with which local computing devices used by cloud consumers, such as, for example, personal digital assistant (PDA) or cellular telephone 1000A, desktop computer 1000B, laptop computer 1000C, and/or automobile computer system 1000N may communicate. Nodes 100 may communicate with one another. They may be grouped (not shown) physically or virtually, in one or more networks, such as Private, Community, Public, or Hybrid clouds as described hereinabove, or a combination thereof. This allows cloud computing environment 1000 to offer infrastructure, platforms and/or software as services for which a cloud consumer does not need to maintain resources on a local computing device. It is understood that the types of computing devices 1000A-N shown in FIG. 5 are intended to be illustrative only and that computing nodes 100 and cloud computing environment 1000 can communicate with any type of computerized device over any type of network and/or network addressable connection (e.g., using a web browser).

Figure 6:
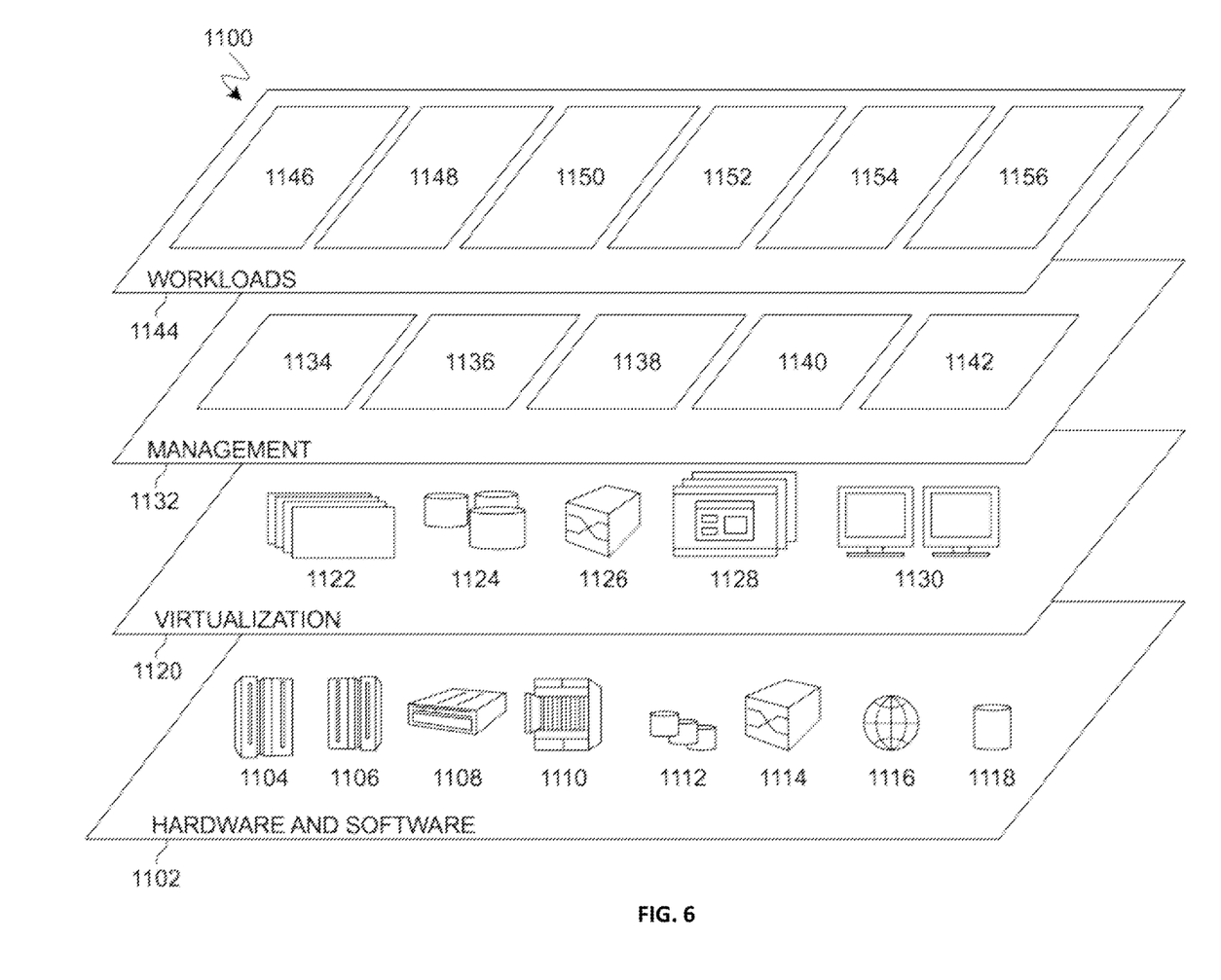
FIG. 6 is a block diagram of functional layers of the illustrative cloud computing environment of FIG. 5, in accordance with an embodiment of the present disclosure.

Referring now to FIG. 6, a set of functional abstraction layers 1100 provided by cloud computing environment 1000 is shown. It should be understood in advance that the components, layers, and functions shown in FIG. 6 are intended to be illustrative only and embodiments of the invention are not limited thereto. As depicted, the following layers and corresponding functions are provided:

Hardware and software layer 1102 includes hardware and software components. Examples of hardware components include: mainframes 1104; RISC (Reduced Instruction Set Computer) architecture based servers 1106; servers 1108; blade servers 1110; storage devices 1112; and networks and networking components 1114. In some embodiments, software components include network application server software 1116 and database software 1118.

Virtualization layer 1120 provides an abstraction layer from which the following examples of virtual entities may be provided: virtual servers 1122; virtual storage 1124; virtual networks 1126, including virtual private networks; virtual applications and operating systems 1128; and virtual clients 1130.

In one example, management layer 1132 may provide the functions described below. Resource provisioning 1134 provides dynamic procurement of computing resources and other resources that are utilized to perform tasks within the cloud computing environment. Metering and Pricing 1136 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 1138 provides access to the cloud computing environment for consumers and system administrators. Service level management 1140 provides cloud computing resource allocation and management such that required service levels are met. Service Level Agreement (SLA) planning and fulfillment 1142 provide pre-arrangement for, and procurement of, cloud computing resources for which a future requirement is anticipated in accordance with an SLA.

Workloads layer 1144 provides examples of functionality for which the cloud computing environment may be utilized. Examples of workloads and functions which may be provided from this layer include: mapping and navigation 1146; software development and lifecycle management 1148; virtual classroom education delivery 1150; data analytics processing 1152; transaction processing 1154; and content navigation 1156. A content navigation program 110a, 110b provides a way to programmatically control media content navigation based on related (e.g., correlated) textual content.

The descriptions of the various embodiments of the present invention have been presented for purposes of illustration but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for content navigation within a media player, the method comprising: displaying, by a computing device, a media content and a corresponding textual content; receiving, from a user, input regarding the textual content, wherein the input regarding the textual content is a symbol relating to a playback of the media content drawn in an inbuilt paint application, wherein a corresponding action for the symbol is learned using a machine learning algorithm based on a historical action of the user; modifying the playback of the media content based upon the input regarding the textual content to generate a modified media content; and playing the modified media content.

2. The method of claim 1, further comprising:
   overlaying a pointer over the textual content in a synchronized manner corresponding to a playback of the media content; and
   controlling the playback of the media content using the overlaid pointer.

3. The method of claim 1, wherein the symbol is a received contextual interaction including a defined boundary around a portion of the textual content using a connected stylus.

4. The method of claim 1, further comprising:
   linking at least two sections of the textual content from two or more media contents, to enable the combination of the two or more media contents which were not previously in succession with one another.

5. The method of claim 3, further comprising:
   translating the received contextual interaction in the inbuilt paint application into an action.

6. The method of claim 2, further comprising:
 displaying a media content navigation menu over the textual content to depict a progress of the media content playback, wherein the displayed media content navigation menu enables a user to control the media content from the textual content.

7. The method of claim 1, wherein the modified media content is further validated using the machine learning algorithm, which validation may enable a pointer depicting a location of the current playback to be depicted on the textual content.

8. A computer system for content navigation within a media player, comprising: one or more processors, one or more computer-readable memories, one or more computer-readable tangible storage medium, and program instructions stored on at least one of the one or more tangible storage medium for execution by at least one of the one or more processors via at least one of the one or more memories, wherein the computer system is capable of performing a method comprising: displaying, by a computing device, a media content and a corresponding textual content; receiving, from a user, input regarding the textual content, wherein the input regarding the textual content is a symbol relating to a playback of the media content drawn in an inbuilt paint application, wherein a corresponding action for the symbol is learned using a machine learning algorithm based on a historical action of the user; modifying a playback of the media content based upon the input regarding the textual content to generate a modified media content; and playing the modified media content.

9. The computer system of claim 8, further comprising:
 overlaying a pointer over the textual content in a synchronized manner corresponding to a playback of the media content; and
 controlling the playback of the media content using the overlaid pointer.

10. The computer system of claim 8, wherein the symbol is a received contextual interaction including a defined boundary around a portion of the textual content using a connected stylus.

11. The computer system of claim 8, further comprising:
 linking at least two sections of the textual content from two or more media contents, to enable the combination of the two or more media contents which were not previously in succession with one another.

12. The computer system of claim 10, further comprising:
 translating the received contextual interaction in the inbuilt paint application into an action.

13. The computer system of claim 9, further comprising:
 displaying a media content navigation menu over the textual content to depict a progress of the media content playback, wherein the displayed media content navigation menu enables a user to control the media content from the textual content.

14. The computer system of claim 8, wherein the modified media content is further validated using the machine learning algorithm, which validation may enable a pointer depicting a location of the current playback to be depicted on the textual content.

15. A computer program product for content navigation within a media player, comprising: program instructions stored on one or more non-transitory computer-readable storage media, the program instructions executable by a processor to cause the processor to perform a method comprising: displaying, by a computing device, a media content and a corresponding textual content; receiving, from a user, input regarding the textual content, wherein the input regarding the textual content is a symbol relating to a playback of the media content drawn in an inbuilt paint application, wherein a corresponding action for the symbol is learned using a machine learning algorithm based on a historical action of the user; modifying a playback of the media content based upon the input regarding the textual content to generate a modified media content; and playing the modified media content.

16. The computer program product of claim 15, further comprising:
 overlaying a pointer over the textual content in a synchronized manner corresponding to a playback of the media content; and
 controlling the playback of the media content using the overlaid pointer.

17. The computer program product of claim 15, wherein the symbol is a received contextual interaction including a defined boundary around a portion of the textual content using a connected stylus.

18. The computer program product of claim 15, further comprising:
 linking at least two sections of the textual content from two or more media contents, to enable the combination of the two or more media contents which were not previously in succession with one another.

19. The computer program product of claim 17, further comprising:
 translating the received contextual interaction in the inbuilt paint application into an action.

20. The computer program product of claim 16, further comprising:
 displaying a media content navigation menu over the textual content to depict a progress of the media content playback, wherein the displayed media content navigation menu enables a user to control the media content from the textual content.

* * * * *